March 31, 1964    J. L. WELCH ETAL    3,126,779
APPARATUS FOR PIERCING A MOVING HELICAL STRIP Filed Aug. 25, 1960    3 Sheets—Sheet 1

Inventors
Jerold L. Welch
Joseph W. Gernon
by Paul A. Frank
Their Attorney

Inventors
Jerold L. Welch
Joseph W. Gernon
by Paul A. Frank
Their Attorney

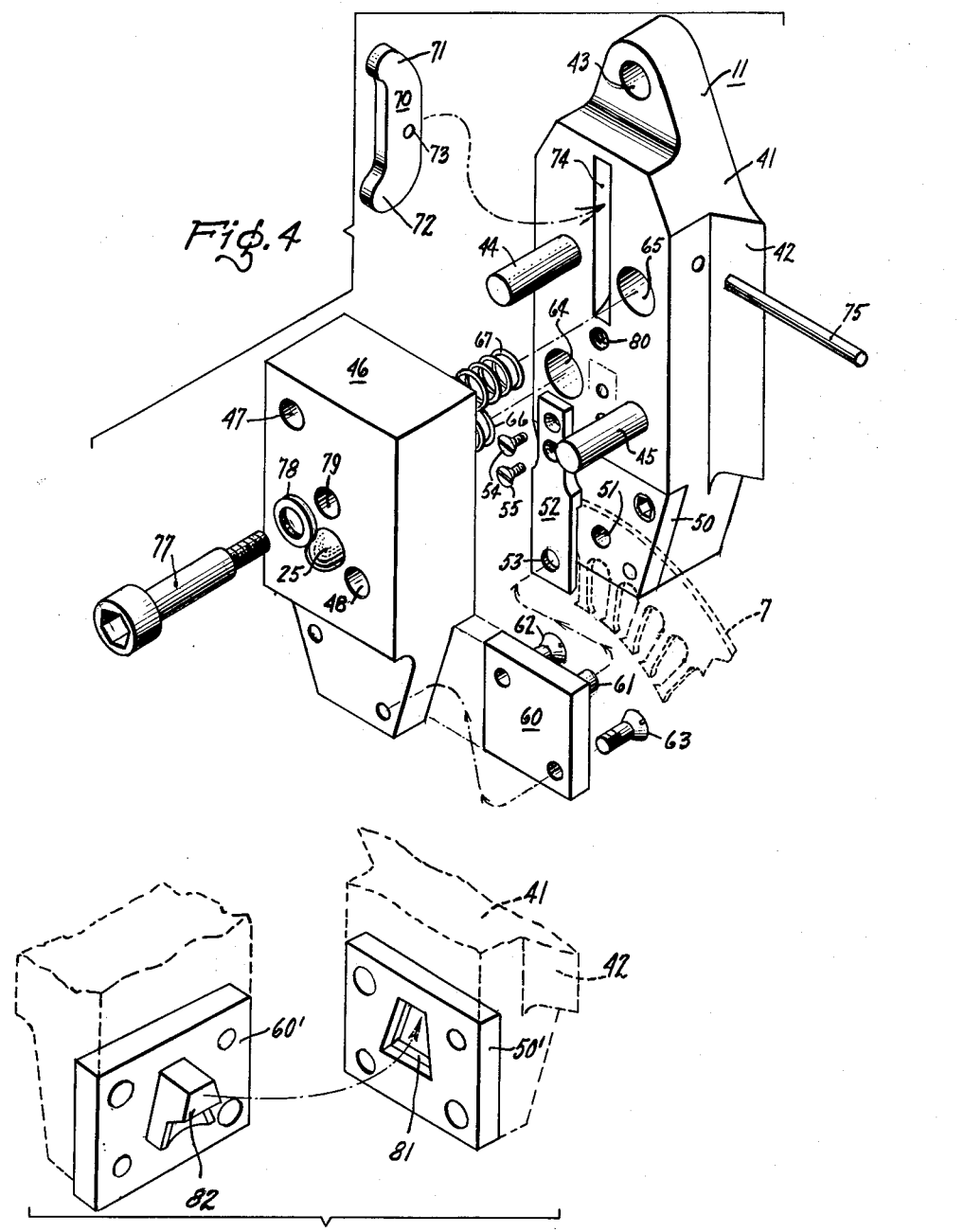

United States Patent Office 3,126,779
Patented Mar. 31, 1964

3,126,779
APPARATUS FOR PIERCING A MOVING
HELICAL STRIP
Jerold L. Welch, Schenectady, and Joseph W. Gernon,
Burnt Hills, N.Y., assignors to General Electric Company, a corporation of New York
Filed Aug. 25, 1960, Ser. No. 51,924
5 Claims. (Cl. 83—338)

This invention relates to an apparatus for piercing a moving strip, and more particularly, to an apparatus for piercing a moving helical strip to be formed into a stator construction for electric motors.

Most laminated motor stator constructions commercially available at the present time are formed from stamped discs fabricated from sheets of metal, such as core iron or silicon steel. These discs are suitably stacked, compressed, and fastened to form a unitary structure having slots into which electrical windings are placed. The fastening is usually achieved by welding, riveting, or by use of Welch keys which are expanded in suitable slots formed in the stator.

In recent years, great consideration has been given to edgewise winding of stator constructions wherein the stator is formed by helically winding a notched strip. Such a method and apparatus is disclosed in the copending application of Benjamin F. Hart and Roland P. Carlson entitled, "Method and Apparatus for Forming Electromagnetic Core Constructions," Serial No. 858,198, filed December 8, 1959, and assigned to the assignee of the present application. In that application, a continuous thin metal strip having one edge thereof suitably notched is helically wound in a manner that the notches therein are aligned on a continuously rotating arbor. Holes are pierced in the continuously moving helically wound strip immediately after winding, these holes being provided to permit the passage therethrough for suitable mounting bolts. The pierced, notched strip is severed at predetermined intervals on the arbor and these segments of helically wound strips form individual stator constructions.

Piercing of the helically wound strip after the winding operation is required because of the non-homogeneous nature of the metal and the distortion to which the material is subjected. Piercing usually cannot be performed after fastening because of the short circuiting of laminations. For these reasons, piercing of the strip must be performed after forming and before stacking of the individual stator constructions.

The economical advantage of edgewise stator constructions resides not only in the realization of minimizing material waste but also in the possible continuous nature of the stator winding and forming processes. The notched strip is helically wound and continuously rotated on an arbor whereon the strip is pierced and subsequently severed when predetermined stack heights of winding are formed. Such a piercing operation must be performed while the helical strip rotates at a high speed and without impeding or interrupting the motion of the strip.

The chief object of the present invention is to provide an improved apparatus for piercing a continuously moving strip.

A still further object is to provide an apparatus for rotating a plurality of tools about the helically wound strip and urging the tools inward toward the strip, moving the tools along the same arcuate path as the strip while simultaneously piercing the strip at predetermined points.

These and other objects of our invention will be more readily perceived from the following description.

In accordance with the present invention a helically wound strip is rotated about an axis, at least one cutting tool is also rotated about the same axis and at approximately the same speed, the cutting tool being moved radially inward toward the axis until the tool moves adjacent a predetermined point on the moving strip, the tool and the predetermined point on the strip moving along a common arcuate path, and during this interval the tool is urged toward the strip to pierce the strip at the predetermined point.

The attached drawings illustrate a preferred embodiment of the invention in which:

FIGURE 4 is an exploded perspective view of a piercing tool utilized in the apparatus in FIGURES 1 and 2; and FIGURE 5 is a perspective view of a punch for cutting Welch keyways for use in the tool shown in FIGURE 4.

Figure 1:
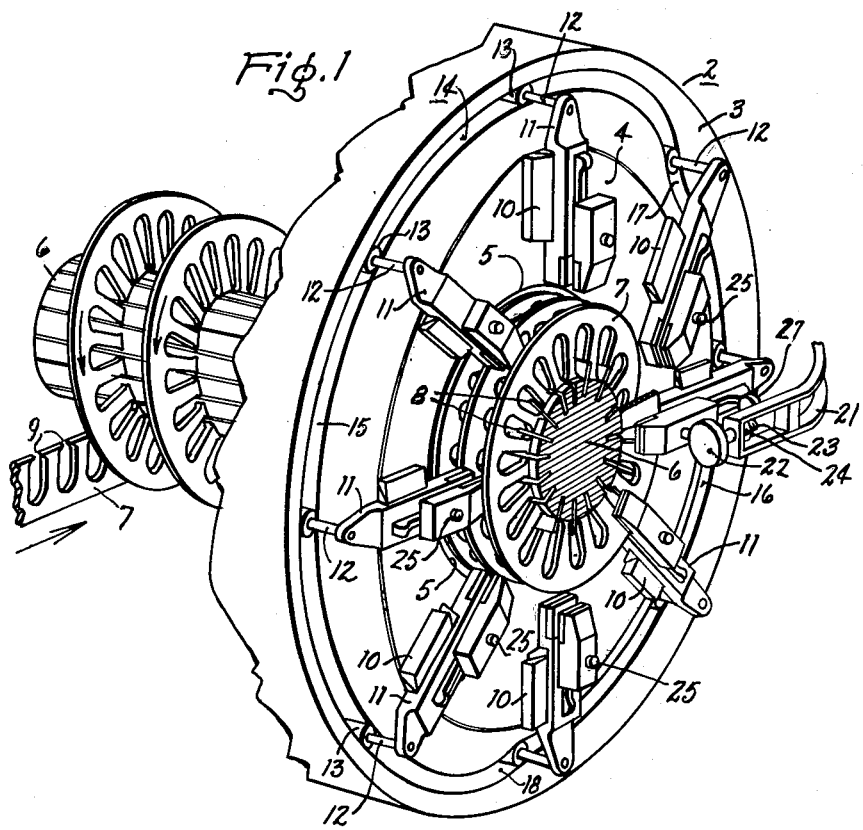
FIGURE 1 is a perspective view of an apparatus for practicing the present invention.
Figure 2:
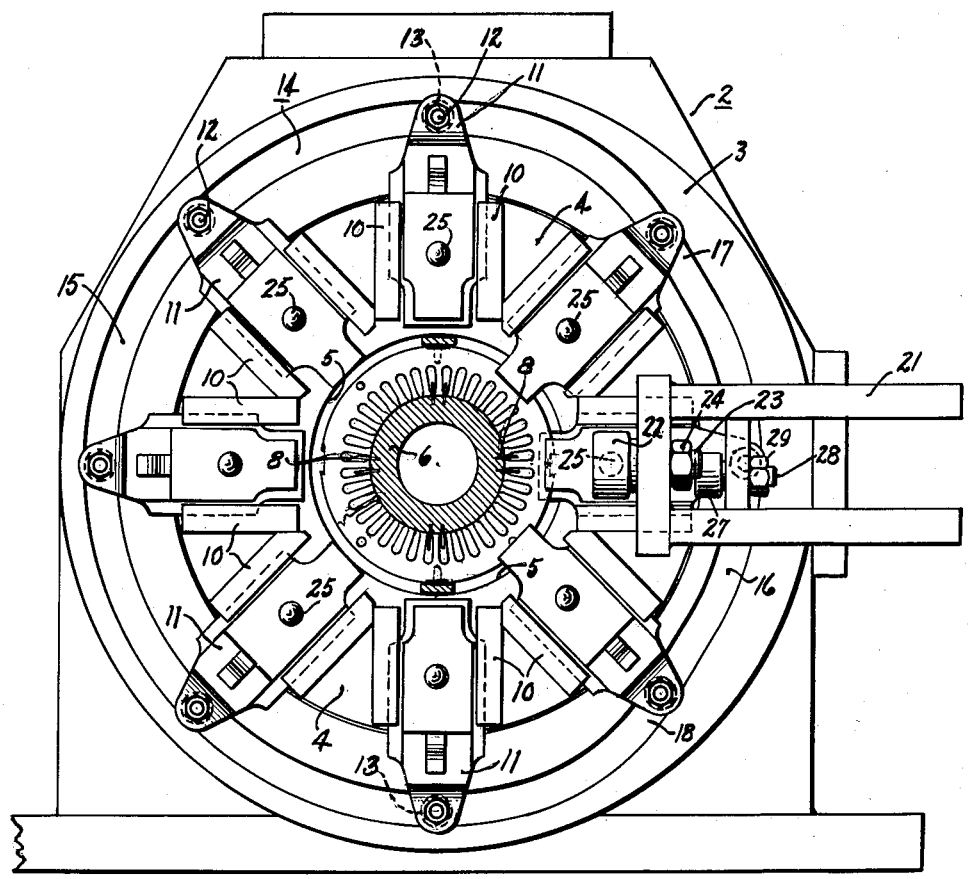
FIGURE 2 is an end view in elevation of the apparatus shown in FIGURE 1.

In the drawings, FIGURE 1 is a perspective view showing a notched strip being wound about an arbor, the strip being notched while rotating on the arbor. FIGURE 2 is an end view in elevation of the piercing portion of the apparatus. Referring to FIGURES 1 and 2, the piercing apparatus 2 comprises a stator 3 and a rotor 4. Stator 3 substantially envelops rotor 4 and includes bearing means (not shown) which supports the rotor. Rotor 4 may be provided with an opening 5 through which extends a splined arbor 6. Rotor 4 partially envelops splined arbor 6 and is concentric therewith.

A metal strip 7 having suitable notches 9 may be wound about arbor 6 in a manner as described in the copending application of Benjamin F. Hart and Roland P. Carlson, entitled, "Method and Apparatus for Helically Winding Strip Material," Serial No. 858,199, filed December 8, 1959, and assigned to the assignee of the present application. The helically wound strip is engaged by the spline portions 8 of splined arbor 6, the helically wound strip passing through opening 5 in rotor 4 and as the strip emerges from opening 5, it is acted upon by a plurality of tools 11. Tools 11 are movably held by suitable guides 10 having tapered engaging surfaces which permit tools 11 to move radially with respect to the axis common to rotor 4 and splined arbor 6.

In order to move the rotating tools mounted on rotor 4 radially, suitable means may be provided such as annular cam surface 14. Cam surface 14 includes an arcuate portion 15 and a smaller arcuate portion 16. The radius of arcuate portion 16 being smaller than the radius of arcuate portion 15. Arcuate portions 15 and 16 are connected by suitable transition portions 17 and 18. Rollers 13 connected to tools 11 by shafts 12 impart radial motion to the tools.

In FIGURES 1 and 2, the function of cam surface 14 which urges tools 11 inwardly, moving the tool adjacent strip 7 while both the strip and the tool are rotating is illustrated. Each tool 11 is provided with an abutment 25 which engages roller 22 rotatably mounted on stub shaft 23 and anchored by means of nut 24 onto frame 21. In a manner more fully described hereinafter the co-action of roller 22 with abutment 25 of each tool causes selective piercing of strip 7. Also mounted on frame 21 but angularly spaced from roller 22 is roller 27 which by means of shaft 28 and nut 29 is fastened to previously mentioned frame 21.

Figure 3:
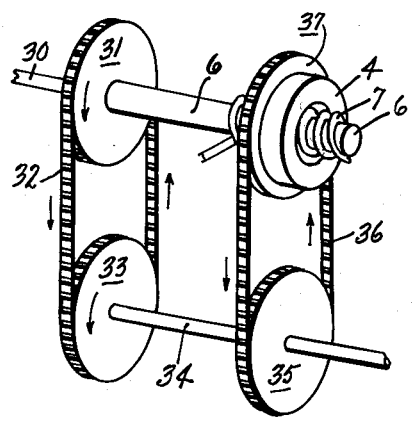
FIGURE 3 is a diagrammatic view showing the means for rotating the arbor and rotor shown in FIGURES 1 and 2 at the same speed.

FIGURE 3 is a diagrammatic view illustrating the drive connection between rotor 4 and arbor 6 in which the rotational speed of both members is maintained the same for a purpose more fully described hereinafter. Rotative motion may be imparted to shaft 30 which is connected to arbor 6. Shaft 30, arbor 6, and rotor 4 are concentrically mounted. Shaft 34 may be mounted parallel to shaft 30. A driving connection is provided between shafts 30 and 34 which may include sprocket 31, chain 32 and sprocket 33, sprockets 31 and 33 being of equal size. A drive connection between shaft 34 and rotor 4 may be provided including sprocket 35 mounted on shaft 34 which is connected to sprocket 37 associated with rotor 4 by means of chain 36.

In FIGURE 4 there is shown an exploded view of tool 11 which may be utilized in the apparatus shown in FIGURES 1 and 2. Tool 11 includes a die holder 41 which is provided with tapered surfaces 42 adapted to engage guides 10 mounted on rotor 4 in a manner to permit reciprocal movement of tool 11 relative to rotor 4. Opening 43 is provided in the upper portion of the die holder to permit passage therethrough of shaft 12 on the end of which is mounted roller 13 adapted to ride in cam surface 14 to impart reciprocal motion to tool 11.

Extending from a surface of die holder 41 are guide posts 44 and 45 upon which punch holder 46 may reciprocate. Suitable openings 47 and 48 may be provided in punch holder 46 to accommodate guide posts 44 and 45. Die holder 41 may provide a suitable recessed portion in the lower portion thereof to accommodate a die plate 50 having an opening 51 therein to accommodate a suitable punch. Die plate 50 is fastened by a suitable means such as bolts to die holder 41. Guide 52 with an opening 53 concentric to opening 51 is fastened by means of bolts 54 and 55 to die holder 41. Guide 52 is provided with a suitable recessed portion so that the portion of the guide adjacent opening 53 provides a space between the guide and die plate 50 to permit the passage of the helically wound strip 7 therebetween.

Punch holder 46 may be provided with a recessed portion adapted to accommodate the punch plate 60 which has extending therefrom punch 61. Punch 61 in FIGURE 4 is shown to be cylindrical in shape and accommodating openings 53 and 51 in guide 52 and plate 50, respectively, are circular in shape. Punch plate 60 may be fastened by suitable bolts 62 and 63 to punch holder 46.

During operation of the apparatus, reciprocal motion is imparted to punch holder 46 by the engagement of abutment 25 with roller 22 shown in FIGURES 1 and 2. This causes a piercing operation to be performed and suitable means may be necessary to retract the punch holder after each piercing operation. To achieve this, suitable springs 66 and 67 are mounted between die holder 41 and punch holder 46. Openings 64 and 65 are provided in die holder 41 to accommodate the springs when the springs are compressed to permit substantial engagement between the punch holder and the die holder.

It has been found that to insure retraction of the punch holder, supplemental retracting means may also be desirable. In the embodiment shown in FIGURE 4 such supplemental means comprises a rocker arm 70 which is pivotally mounted about pin 75 extending through the slot 74 in die holder 41 and transversely through hole 73 in arm 70. Rocker arm 70 is provided with ends 71 and 72. End 71 is adapted to engage roller 27 shown in FIGURE 2 in a manner and for a purpose described more fully hereinafter. When end 71 is engaged, the opposite end 72 engages punch holder 46 to retract the holder.

If desired, means may be included in the construction to limit the movement of punch holder 46. Such a stop may include bolt 77 having an enlarged head portion which acts as an abutment. Bolt 77 passes through washer 78 through opening 79 in punch holder 46 and engages threaded opening 80 in die holder 41. During operation, the movement of the punch holder 46 is limited by the engagement of the punch holder with the head of bolt 77.

FIGURE 5 illustrates another embodiment of the punch which may be utilized with the tool shown in FIGURE 4. In forming motor stators, it is desirable not only to provide mounting bolt holes but also it may be desirable to supply dovetail shaped grooves in the periphery of the stator for Welch keys which are expanded in the dovetail motion with respect to guide 10 and radial motion on slots to lock the various laminations which constitute the stator into position. In FIGURE 5, die plate 50' has an opening 81 adapted to accommodate dovetail punch 82 mounted on punch plate 60'. If desired, the mounting bolt hole punch shown in FIGURE 4 may be supplied on alternate tools 11 with the dovetail punch shown in FIGURE 5. In this manner, the mounting bolt holes and the Welch keyways may be provided in the stator construction.

In operation, notched strip 7 (FIGURE 1) may be wound about arbor 6 in any desired manner, for example, in the manner disclosed in the previously mentioned applications to Hart and Carlson. The strip which is helically wound advances through opening 5 in rotor 4, said rotor and arbor rotating at substantially the same speed because of the previously described drive connection illustrated in FIGURE 3. As a result of the cam surface 14, tools 11 are retracted from the strip while roller portion 13 of each tool is in the arcuate portion 15. When transition portion 17 is encountered, the individual tools are passed radially inward toward the common axis of the rotor and the arbor. By the time the arcuate portion 16 is reached, a portion of strip 7 has passed between die plate 50 and guide plate 52 (FIGURE 4).

Since the tool and the strip have substantially the same rotational speed, punch 61 shown in FIGURE 4 is located adjacent a predetermined point on the strip when roller 13 of the particular tool is in the arcuate portion 16 of cam surface 14. During this interval, punch 61 and the predetermined point on the strip are moving at the same rotational speed and along substantially the same arcuate path. It is, therefore, desirable at this time to pierce the strip, since during this interval the predetermined point which is intended to be pierced and the punch are moving along a common path at the same speed. Any piercing action by punch 61 during this interval will not interfere with the rotational motion of the strip. Such a piercing action is consonant with the over-all object of edgewise winding of stators in that winding and piercing of the strip is a continuous operation resulting without interruption or impeding of strip movement.

As punch 61 moves with the predetermined point on the strip, the abutment 25 shown in FIGURE 2 engages roller 22. Referring to FIGURE 4, it can be seen that engagement of abutment 25 causes punch holder 46 to move toward die holder 41. This action is accompanied by the passage of punch 61 through opening 53 in guide 52, through the predetermined point on strip 7 and into opening 51 in die plate 50. Immediately after the interaction of abutment 25 and roller 22, springs 66 and 65 shown in FIGURE 4 urge punch holder 46 to withdraw punch 61 through opening 53 in guide 52. Recognizing the possibility that under certain circumstances, the action of springs 66 and 67 may be impeded by failure of the springs or associated components, it has been found desirable to provide supplemental retraction means which include rocker arm 70.

In FIGURE 2, roller 27 is shown angularly spaced behind roller 22. At the time that the interaction of abutment 25 and roller 22 ceases, roller 27 engages end 71 of rocker arm 70 to pivot an end 72 to urge die holder 46 away from punch holder 41 until the head of bolt 77 prevents further movement of punch holder 46. In this manner, both the rocker arm and the spring constructions assure retraction of the punch.

After the piercing operation has been completed, roller 13 shown in FIGURE 1 passes into the transition section 18 of cam surface 14 causing tool 11 to move radially outwardly and away from strip 7 until arcuate portion 15 is reached wherein the tools rotate about the rotor and are spaced from strip 7. As previously noted, it may be desired to alternate punches and utilize a dovetail type punch which forms a Welch keyway in the outer periphery of the stator construction.

The present invention provides an improved apparatus for placing mounting bolt holes and Welch keyway slots into strip material which is being formed into a stator construction by edgewise winding. Piercing of the strip by means of the present invention is performed with the tools moving in an arcuate path adjacent to and at the same speed as predetermined points on the strip, the piercing operating being performed in such a manner as not to interrupt or impede the motion of the strip. The fabrication of stator constructions in this manner permits the realization in savings of material which accrue to edgewise type windings and also the realization of high production rates due to the continuous fabrication of such stators.

While we have described a preferred embodiment of our invention it will be understood that our invention is not limited thereto since it may be otherwise embodied within the scope of the appended claims.

What we claim as new and desire to secure by Letters Patent of the United States is:

1. In an apparatus for piercing successive turns of a preformed helical strip wound edgewise, the combination of means including an arbor for rotating the turns edgewise about an axis; an annular cam track spaced outwardly from said arbor comprising first and second arcuate sections, with said second arcuate section being disposed nearer said axis than said first section and having a center of revolution generally at said axis; a rotor arranged to rotate between said annular cam track and said arbor and having a central opening to permit the strip turns to pass therethrough; a tool assembly having means engaging said track and being guided thereby; means carried by said rotor for guiding said tool assembly radially toward and away from said axis in response to movement of the tool assembly along said track for driving said rotor, tool assembly, and an individual strip turn concurrently through a predetermined arcuate path at substantially the same speed and in the same direction when said tool assembly is moved along said second arcuate section; said tool assembly including a pair of cooperating piercing members movably mounted relative to each other, said cooperating piercing members straddling the individual strip turn at a preselected location during travel of said tool assembly along said second arcuate section; operating means disposed along said arcuate path for urging said cooperating members axially into cutting engagement at the preselected location on the strip turn side to perforate the strip axially therethrough; and means effective to retract said cooperating piercing members from cutting engagement before said tool assembly travels beyond said second arcuate section.

2. In an apparatus for piercing successive turns of a preformed helical strip wound edgewise, the combination of means including an arbor for rotating the turns edgewise about an axis; an annular cam track spaced outwardly from said arbor comprising first and second arcuate sections joined together by a pair of transition sections; said first and second arcuate sections each having a center of revolution generally at said axis with said second arcuate section being disposed nearer said axis than said first section; a rotor mounted for rotation between said annular cam track and said arbor, with the strip turns and arbor passing through a central opening in said rotor; a tool assembly having roller means engaging said track and being guided thereby; means carried by said rotor for guiding said tool assembly radially toward and away from said axis in response to movement of the tool assembly along said transition sections; means for driving said rotor, tool assembly, and an individual strip turn concurrently through a predetermined arcuate path at substantially the same speed and in the same direction when said tool assembly is moved along said second arcuate section; said assembly including a pair of cooperating piercing members movably mounted relative to each other and adapted to straddle the strip turn adjacent a predetermined location during travel of said tool assembly along said second arcuate section; means for normally biasing said cooperating piercing members apart; operating means disposed along said arcuate path for overcoming the biasing means and for urging said cooperating members into cutting engagement at the predetermined location on the strip turn side to perforate the strip axially therethrough; and means supplementing said biasing means for retracting said cooperating piercing members before said tool assembly enters said first arcuate section; the supplemental means being operated to retract said cooperating piercing members angularly beyond said operating means at said arcuate path.

3. In an apparatus for piercing successive turns of a preformed helical strip wound edgewise, the combination of means including an arbor for rotating the turns edgewise about an axis; an annular cam track spaced outwardly from said arbor comprising first and second arcuate sections joined together by a pair of transition sections, with said second arcuate section being disposed nearer said axis than said first section and having a center of revolution generally at said axis; a rotor arranged to revolve between said annular cam track and said arbor and formed with a central opening accommodating the arbor and strip turns in spaced relation; a tool assembly having means engaging said track and being guided thereby; means carried by said rotor for guiding said tool assembly radially toward and away from said axis in response to movement of the tool assembly along said track; means for driving said rotor, tool assembly, and an individual strip turn concurrently through a predetermined arcuate path at substantially the same speed and in the same direction when said tool assembly is moved along said second arcuate section; said tool assembly including a pair of cooperating piercing members movably mounted relative to each other for piercing the individual strip turn in an axial direction at a predetermined location, said cooperating members arranged to straddle the individual turn at the predetermined location during travel of said tool assembly along said second arcuate section; means for normally biasing said cooperating piercing members apart; operating means disposed along said arcuate path for overcoming the biasing means and for urging said cooperating members into cutting engagement at the predetermined location on the strip turn side to perforate the strip axially therethrough; means carried by said tool assembly arranged to contact at least one of said cooperating members for supplementing said biasing means in retracting said piercing members after the strip turn has been perforated; and actuator means mounted angularly beyond and adjacent said operating means in the path of travel of the supplemental retracting means at said arcuate path, said actuator means being arranged to engage said supplemental retracting means for actuating it before said tool assembly passes from said second arcuate section into the associated transition section.

4. The apparatus according to claim 3 in which the supplemental means includes a rocker arm movably mounted on one piercing member and arranged to be engaged by said actuator means for swinging the arm into contact with the other piercing member thereby assisting said biasing means in the retraction of said cooperating piercing members from their cutting engagement with the strip turn.

5. The apparatus according to claim 3 in which said actuator means is a roller and said supplemental means includes a rocker arm pivotally mounted intermediate its ends on one piercing member, with one end arranged to be engaged by said roller for swinging the other end into contact with the other piercing member thereby assisting said biasing means in the retraction of said piercing members from cutting engagement with the strip turn as the tool assembly travels along said second arcuate section.

References Cited in the file of this patent
UNITED STATES PATENTS

| | | |
|---|---|---|
| 345,365 | Cheswright | July 13, 1886 |
| 1,213,275 | Schroeder | Jan. 23, 1917 |
| 1,910,395 | Kreis | May 23, 1933 |
| 2,604,099 | Policansky | July 22, 1952 |
| 2,619,177 | Praturlon | Nov. 25, 1952 |
| 2,764,237 | Adams | Sept. 25, 1956 |